US012688755B2

(12) United States Patent
Sakamoto et al.

(10) Patent No.: US 12,688,755 B2
(45) Date of Patent: Jul. 21, 2026

(54) GAME DEVICE AND STORAGE MEDIUM

(71) Applicant: BANDAI CO., LTD., Tokyo (JP)

(72) Inventors: Daisuke Sakamoto, Tokyo (JP); Yuri Okamoto, Tokyo (JP); Erika Yasuda, Tokyo (JP); Asaki Murakami, Tokyo (JP); Atsushi Yashiki, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 267 days.

(21) Appl. No.: 18/434,885

(22) Filed: Feb. 7, 2024

(65) Prior Publication Data

US 2024/0265785 A1 Aug. 8, 2024

(30) Foreign Application Priority Data

Feb. 8, 2023 (JP) ................................ 2023-017961
Feb. 21, 2023 (JP) ................................ 2023-025508

(51) Int. Cl.
*G07F 17/00* (2006.01)
*G07F 17/32* (2006.01)

(52) U.S. Cl.
CPC .................................. *G07F 17/329* (2013.01)

(58) Field of Classification Search
None
See application file for complete search history.

(56) References Cited

U.S. PATENT DOCUMENTS 7,995,064 B2 * 8/2011 Guymon, III ........... H04L 51/04 463/31
8,547,401 B2 * 10/2013 Mallinson ............. A63F 13/217 345/632
9,480,908 B2 * 11/2016 Brown ................ G07F 17/3279
2002/0012525 A1 * 1/2002 Yuen .................... G11B 15/087
2004/0046800 A1 * 3/2004 Emerson ............... A63F 13/833 715/810
2005/0005266 A1 * 1/2005 Datig ....................... G06N 5/02 717/136

(Continued)

FOREIGN PATENT DOCUMENTS

JP 2020-006054 A 1/2020
JP 2020-006264 A 1/2020

OTHER PUBLICATIONS

Mar. 31, 2023, Japanese Office Action issued for related JP Application No. 2023-025508.

*Primary Examiner* — Paul A D'Agostino
(74) *Attorney, Agent, or Firm* — Paratus Law Group, PLLC

(57) ABSTRACT

A game device is configured to: cause a first character related to a game that is played on the game device to be displayed on a display; and perform communication by a first method of transmitting and receiving information to and from another game device and a second method of transmitting and receiving information to and from an external device. The game device is configured to: obtain information about a second appearing in the game that is played on the another game device from the another game device through the first method, and obtain information about a third character appearing in the game that is played on any one game device from the external device through the second method. The game device is configured to cause characters selected from the second character and the third character to be displayed in a predetermined area during the game.

20 Claims, 8 Drawing Sheets

(56) References Cited

U.S. PATENT DOCUMENTS

| | | | | |
|---|---|---|---|---|
| 2006/0038833 | A1* | 2/2006 | Mallinson | G06F 1/1686<br>345/633 |
| 2009/0098919 | A1* | 4/2009 | Yuji | A63F 13/47<br>463/9 |
| 2009/0180425 | A1* | 7/2009 | Watanabe | H04W 84/18<br>370/328 |
| 2016/0129349 | A1* | 5/2016 | Zhao | A63F 13/80<br>463/31 |
| 2016/0166921 | A1* | 6/2016 | Zhang | A63F 13/87<br>463/31 |
| 2017/0163313 | A1* | 6/2017 | Cho | H04B 5/77 |
| 2018/0353860 | A1* | 12/2018 | Nakamura | A63F 13/31 |
| 2020/0016491 | A1* | 1/2020 | Kitsugi | A63F 13/5375 |
| 2023/0221833 | A1* | 7/2023 | Holder | G02B 27/0093<br>715/716 |
| 2023/0259265 | A1* | 8/2023 | Krivoruchko | G06F 3/013<br>715/784 |
| 2024/0020371 | A1* | 1/2024 | Dedonato | G06F 21/32 |
| 2025/0348186 | A1* | 11/2025 | Krivoruchko | G06F 3/017 |
| 2025/0377778 | A1* | 12/2025 | Gitter | G06F 3/013 |

* cited by examiner

GAME DEVICE AND STORAGE MEDIUM

CROSS-REFERENCE RELATED APPLICATIONS

This application is based on and claims priority under 35 USC 119 from Japanese Patent Application No. 2023-017961 filed on Feb. 8, 2023 and Japanese Patent Application No. 2023-025508 filed on Feb. 21, 2023, the contents of which are incorporated herein by reference.

TECHNICAL FIELD

The present disclosure relates to a game device and a storage medium, and in particular to an electronic game accompanied by display of characters.

BACKGROUND ART

There is a game system that makes it possible to play an interaction game, in which characters developed by a variety of users, including users from a wide range of areas, are collected, on a smartphone by transmitting information about a character developed in a game device to a server via the smartphone. See Japanese Patent Application Laid-Open Publication No. 2020-006264 (hereinafter, referred to as Patent Literature 1)

However, in the game system of Patent Literature 1, the play experience of the interaction game is provided only on the smartphone. As a result, there is a possibility that an amusement element may not be suitably provided to a user who does not possess a smartphone or to a user at an earlier age.

In addition, in the game system of Patent Literature 1, amusement elements regarding interaction are also provided by a method of executing an event in which characters developed in both game devices appear on one game device by directly performing information communication between two game devices, for example, game devices possessed by friends.

However, in the above game system, since these interaction elements are provided independently, for example, it is necessary to interact with friends through direct communication and with other users through interaction games, which is complicated.

The present disclosure provides a game device having a communication element with high amusement, and a storage medium.

SUMMARY

A game device according to an embodiment of the present disclosure includes:

BRIEF DESCRIPTION OF DRAWINGS

Exemplary embodiments of the present disclosure will be described in detail based on the following figures, wherein.

DESCRIPTION OF EMBODIMENTS

First Embodiment

Hereinafter, embodiments will be described in detail with reference to the accompanying drawings. Note that the following embodiments do not limit the disclosure of the claims and all combinations of features described in the embodiments are essential to the disclosure.

Two or more of the features described in the embodiments may be arbitrarily combined. In addition, the same reference number is assigned to the same or similar component, and duplicate descriptions will be omitted.

An embodiment described below describes an example in which the present disclosure is applied to a game device that can play a game (hereinafter, referred to as a development game) in which characters are developed, which is an example of the game device. However, the present disclosure is applicable to any device having a communication function and configured to be able to play a game in which characters appear.

Configuration of Game System

Figure 1:
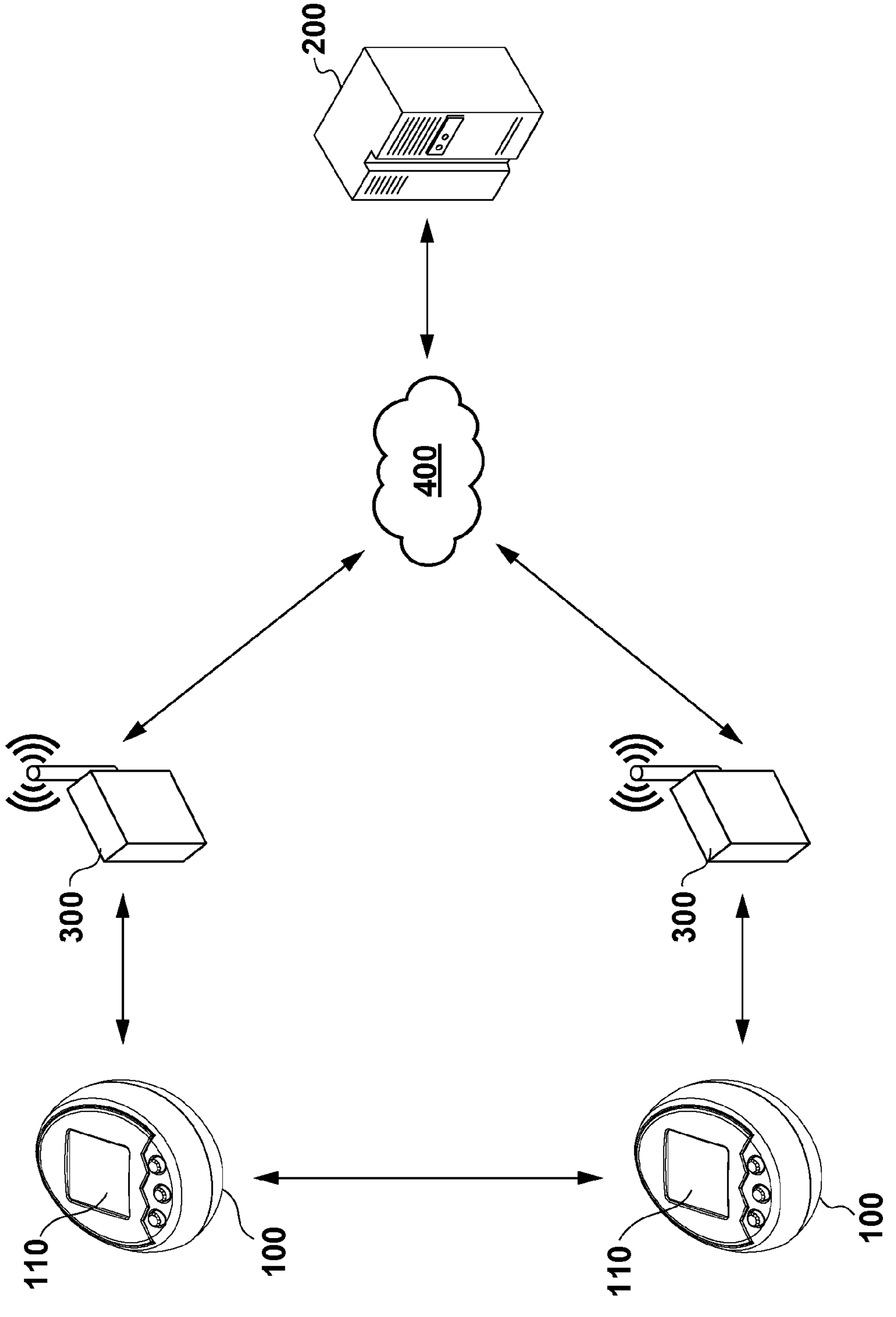
FIG. 1 is a diagram showing an example of a configuration of a game system according to an embodiment and a modified example of the present disclosure.

FIG. 1 is a diagram showing a configuration of a game system according to an embodiment of the present disclosure. As shown, in the game system, a game device 100 is configured to enable wireless communication with another game device 100 and a server 200. As will be described in detail below, the game device 100 is configured to enable communication by two types of communication methods and transmits and receives information using different communication methods when communicating with another game device 100 and when communicating with the server 200. As shown, communication between the game device 100 and the server 200 is performed via an access point (AP) 300 and a network 400, and thus is different from communication that is directly performed between the game devices 100. In the present embodiment, in order to realize interaction among users present in various areas, the network 400 is described as a wide area network (WAN) such as the Internet, but may also be a LAN in other aspects.

Hardware Configuration of Game Device

Figure 2:
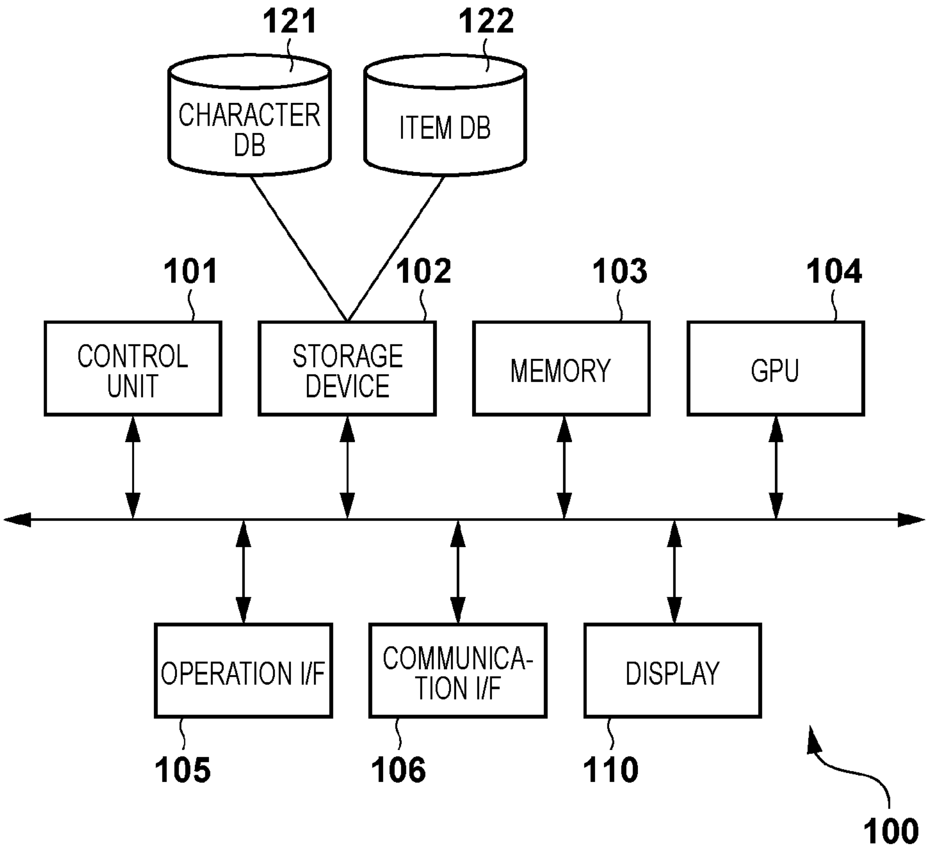
FIG. 2 is a diagram showing an example of a hardware configuration of a game device 100 according to the embodiment and modified example of the present disclosure.

Subsequently, a hardware configuration of the game device 100 will be described using FIG. 2. FIG. 2 is a block diagram showing an example of a hardware configuration of the gate device 100.

A control unit 101 is a processor such as a CPU, and performs various controls including operation control of each hardware included in the game device 100. Specifically, the control unit 101, for example, reads out a necessary program stored in a storage device 102, deploys the program on a memory 103, and executes the program, thereby performing corresponding control.

The storage device 102 is a device that can permanently store information, such as a non-volatile memory. The storage device 102 stores information on parameters necessary for implementing various controls, in addition to programs related to operations of the game device 100 and programs for a development game that is played on the game device 100. In addition, the storage device 102 also functions as a database (character DB 121 and item DB 122) of various data related to the development game. Additionally, the memory 103 is a storage device that is used to temporarily store data, such as a volatile memory. The memory 103 may be used not only as a deployment region for each program but also as a storage region for temporarily storing data and the like output during various hardware operations or various control processes.

Figure 6A:
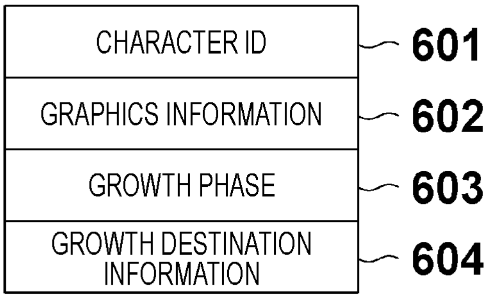
FIG. 6A is a diagram showing an example of a data structure of various types of information that is used in the game system according to the embodiment and modified example of the present disclosure.

A character DB 121 is a database that manages, as records, information (character information) about characters that can be developed in the development game. In the development game that is played on the game device 100 of the present embodiment, a user can develop a character that grows through a plurality of growth phases. A character is configured so that an appearance thereof is different every time the growth phase changes. The character DB 121 manages, as records, various information about each appearance that a character can have at each growth phase. As shown in FIG. 6A, for example, the character information regarding one record includes, in association with a character ID 601 that uniquely identifies (appearance of) a character, graphics information 602 for drawing the appearance of the character, a growth phase 603 indicating a growth phase at which the character has the appearance, and growth destination information 604 indicating an appearance to which the character can grow from an appearance in question. The growth destination information 604 may be one in which information on the corresponding character ID 601 is stored.

Figure 6B:
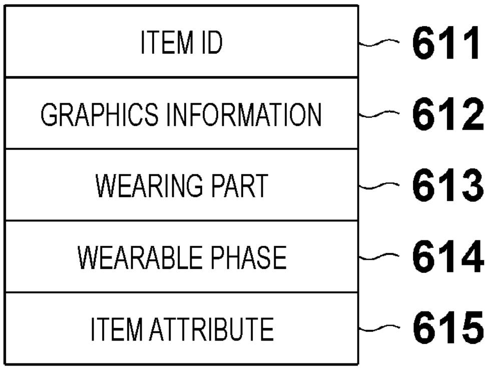
FIG. 6B is a diagram showing an example of a data structure of various types of information that is used in the game system according to the embodiment and modified example of the present disclosure.

In addition, an item DB 122 is a database that manages, as records, information (item information) about items that can be worn on characters in the development game. In the development game that is played on the game device 100 of the present embodiment, items can be worn on a character being developed. The item may be, for example, one that can be acquired in the development game, or may be one that can be obtained in the form of DLC or the like by purchasing a predetermined product. As described above, the character changes in appearance at each growth phase, and the number of items that can be worn increases as the growth phase progresses. As shown in FIG. 6B, for example, the item information regarding one record of the item DB 122 includes, in association with an item ID 611 that uniquely identifies an item, graphics information 612 for drawing an appearance of the item, a wearing part 613 indicating a part of the character on which the item can be worn, a wearable phase 614 indicating a growth phase at which the item can be worn, and an item attribute 615 indicating an attribute annexed to the item.

The GPU 104 is a drawing device that performs various drawing processing related to creation of a display screen regarding the game device 100. The GPU 104 includes a GPU memory (not shown), develops various graphics data read from the storage device 102, and performs predetermined calculations, thereby creating various images (screens) related to the development game. The screen or image created by the GPU 104 is presented to the user, for example, by being displayed on a display 110 of the game device 100. The display 110 is a device that displays information provided by the game device 100, such as a liquid crystal monitor.

An operation I/F 105 is a user interface that receives an operation input provided by the game device 100. When the operation I/F 105 detects that an operation input has been made, the operation I/F outputs a control signal corresponding to the operation input to the control unit 101. In an aspect, the operation I/F 105 includes, for example, operation members such as buttons provided on the exterior of the game device 100 and various sensors. In addition, in an aspect in which the display 110 is configured to be able to detect a touch input, the operation I/F 105 includes a touch input detection sensor provided in the display 110.

A communication I/F 106 is a communication interface with an external device provided by the game device 100. As described above, the game device 100 of the present embodiment performs wireless information communication with other devices by two types of communication methods. One communication method is communication in an ad hoc mode (hereinafter, referred to as ad hoc communication) as the first communication method according to the present disclosure in which the game device 100 is not required to be connected to the AP 300 and information is directly transmitted and received between the devices in such a form that one of the game device 100 and another game device 100 becomes a host and the other connects to the host. Another communication method is communication in an infrastructure mode (hereinafter, referred to as infrastructure communication) as the second communication method according to the present disclosure in which each game device 100 connects to the associated AP 300 and information is transmitted and received between the game device 100 and the server 200 via the AP 300 and the network 400. Note that in the present embodiment, the two types of communication methods that the communication I/F 106 can use are described as the ad hoc communication and the infrastructure communication. However, the implementation of the present disclosure is not limited thereto, and other types of communication can also be included.

Hardware Configuration of Server

Figure 3:
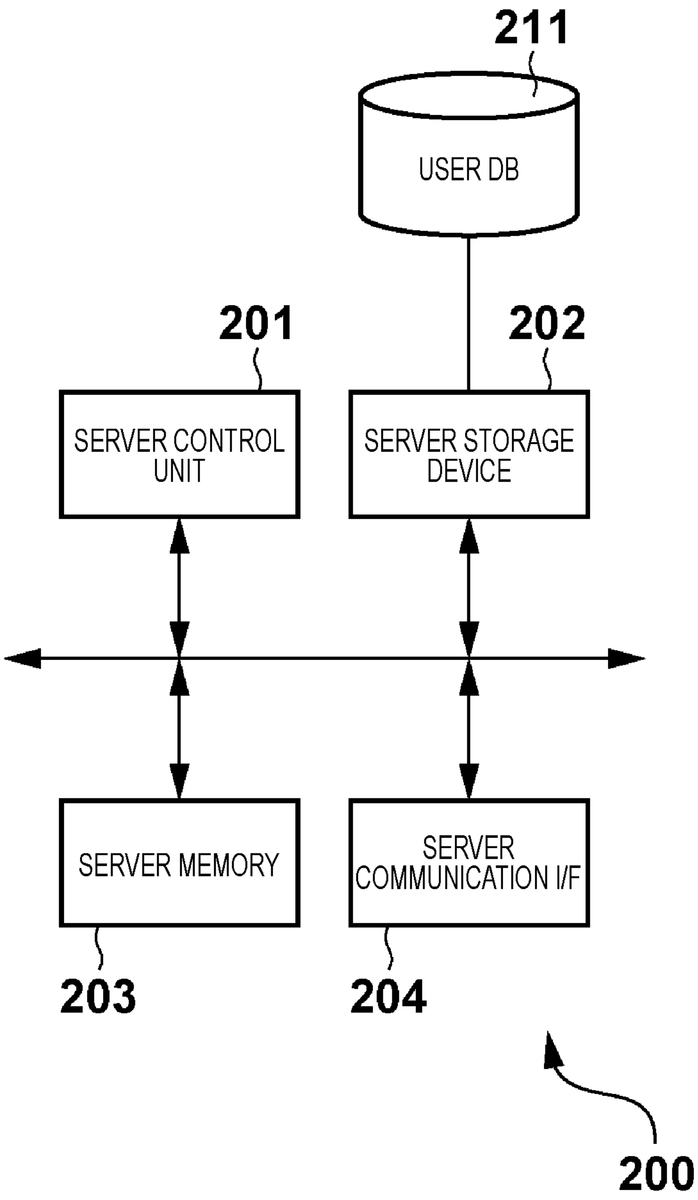
FIG. 3 is a diagram showing an example of a hardware configuration of a server 200 according to the embodiment and modified example of the present disclosure.

FIG. 3 is a block view showing a hardware configuration of the server 200 according to the present embodiment. Note that in the following description, the hardware configuration that realizes functions, which are the same as, and/or similar to, those of the game device 100, will be prefixed with the letter "server" in order to distinguish the same from the configuration of the game device 100.

A server control unit 201 is a processor such as a CPU, and performs operation control of each hardware included in the server 200 and control regarding realization of various functions including user management and an interaction function regarding the development game. Specifically, the server control unit 201, for example, reads out a necessary program stored in a server storage device 202, deploys the program on a server memory 203, and executes the program, thereby performing corresponding control.

The server storage device 202 is a device that can permanently store information, such as a non-volatile memory or an HDD. The server storage device 202 stores, in addition to an operating system for operating the server 200 and a matching program, information on parameters and various data necessary for implementing various controls. In addition, the server storage device 202 also functions as a database of various data regarding users who use the game devices 100. Additionally, the server memory 203 is a storage device that is used to temporarily store data, such as a volatile memory. The server memory 203 may be used not only as a deployment region for each program but also as a storage region for temporarily storing data and the like output during various hardware operations or various control processes.

Figure 6C:
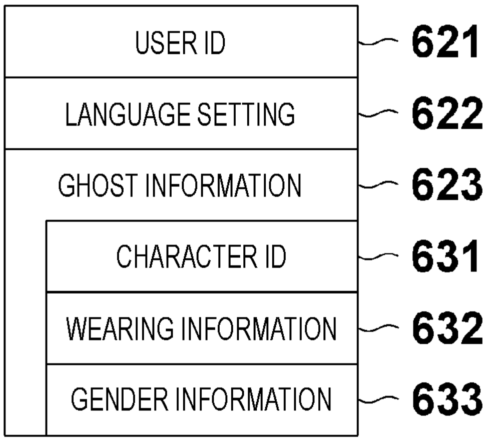
FIG. 6C is a diagram showing an example of a data structure of various types of information that is used in the game system according to the embodiment and modified example of the present disclosure.

A user DB 211 is a database that manages, as records, information (user information) about users who use the game devices 100. In the game system of the present embodiment, a progress status of the development game of the game device 100 used by each user is managed on the server 200 and is configured to be shareable with another game device 100, in order to provide elements for characters to interact with each other even when the game devices 100 are not directly connected to each other. For example, as shown in FIG. 6C, the user information regarding one record of the user DB 211 includes, in association with a user ID 621 that uniquely identifies a user, a language setting 622 set in the game device 100 used by the user, and ghost information 623 about a character that the user is developing on the game device 100. Here, for the user ID 621, unique information such as an individual identification number of the game device 100 used by the user may be used.

In addition, the information about the character being developed on each game device 100, which is managed in the user DB 211, indicates a status of the character being developed on the game device 100 at the time of receiving the information in question, and strictly speaking, may be different from the character being developed on the game device 100 in question at the time when the information in question is used in the server 200 and the like. For this reason, in the present embodiment, the information about the character managed in the user DB 211 is expressed as "ghost" in order to mean an appearance of the character that was being developed at a certain point in time, and is managed as the ghost information 623. The ghost information 623 may include a character ID 631 indicating an appearance of the character being developed, wearing information 632 indicating an item wearing status on the character, and gender information 633 indicating the gender of the character.

A server communication I/F 204 is a communication interface with an external device provided by the server 200. Information communication between the server communication I/F 204 and an external device may be performed via a wide area network (WAN) such as the Internet, or may be performed via a LAN or the like. The information communication performed by the server communication I/F 204 may be performed in a wired manner or a wireless manner.

Game Outline

Below, an outline of a game in which play experience is provided on the game device 100 of the present embodiment will be described. In the present embodiment, the game is described as a development game that provides, as amusement elements, a development element of a character, a communication element between a user and a character, and an interaction element between characters. However, the development game is only one type of game in which a character appears, and the implementation of the present disclosure is not limited thereto. The present disclosure is applicable to any game in which a character whose motion is controlled in response to an operation input made by the user appears. Here, the motion control is not limited to directly operating a character by the user, but includes indirectly changing behavior or motion of a character in response to changes in parameters or environment as a result of evaluating the operation input made by the user.

In the development game, a user can develop a character by performing an operation input regarding the care of the character. The development game starts with, for example, hatching an egg, progresses through growth phases by sequentially making operation inputs regarding necessary care, and presents growing aspects of the character while changing an appearance of the character.

The character is configured so that an item can be worn, and the user can add decoration to the appearance of the character by wearing an item and the like acquired in the development game on the character. Parts where items can be worn are configured to increase as the growth phase progresses, and the parts where items can be worn are limited to certain portions until a predetermined growth phase is reached. The wearable parts may include, for example, the character's head, face, torso, legs, and hands, and may be configured so that a hat item, a glasses item, a clothing item, a shoe item, an accessory (belongings), and the like can be worn, respectively.

Communication Element

The development game is configured so that a character developed by another user can be caused to appear through communication with an external device. For this reason, the game device 100 obtains information about the character being developed by another user via the communication I/F 106. As described above, the communication I/F 106 enables information communication by two types of communication methods, each of which can obtain information about characters. More specifically, the communication I/F 106 obtains information about the character being developed on another game device 100 via the ad hoc communication from another game device 100. Additionally, the communication I/F 106 obtains information about the character being developed on any one game device 100 that has been connected to the server 200 via the infrastructure communication from the server 200.

In the below, the character being developed on the game device 100 is referred to as a "own character", the character being developed on another game device 100, the information thereof being obtained via the ad hoc communication from another game device 100 in question, is referred to as a "friend character", and the character being developed on any one game device 100 connected to the server 200, the information thereof being obtained via the infrastructure communication from the server 200, is referred to as an "another-user character" in order to make a distinction. In other words, the own character is, in the development game played on the game device 100, a character whose motion is controlled in response to an operation input from a user of the game device 100 in question. In addition, the friend character is, in the development game played on another game device 100 connected via the ad hoc communication, a character whose motion is controlled in response to an operation input from a user of the game device 100 in question. Additionally, another-user character is, in the development game played on any one game device 100 communicatively connected to the server 200, a character whose motion is controlled in response to an operation input from a user of the game device 100 in question.

In order to enable obtainment of information about a character via the infrastructure communication, each game device 100 is configured to periodically connect to the server 200 via the infrastructure communication, for example, at a predetermined time, and to upload information about an own character being developed. The uploaded information about the own character is used to update the ghost information 623 of the user information managed for the corresponding user. Accordingly, the game device 100 is configured to regularly upload the user ID, the language setting, and the information about the own character (character ID, wearing information, gender information) to the server 200, as well as the user information.

Figure 6D:
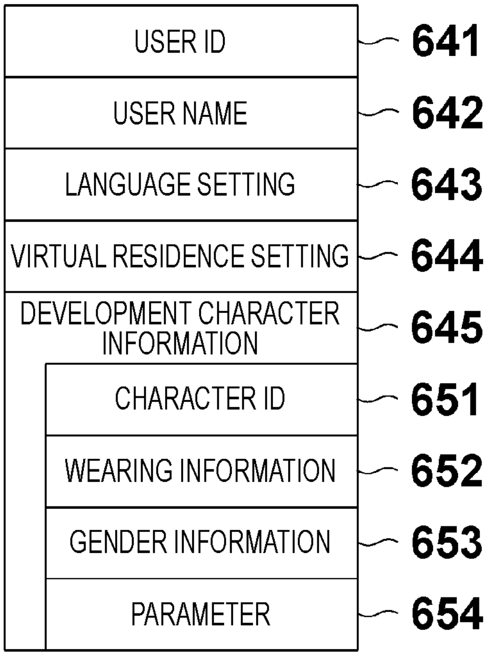
FIG. 6D is a diagram showing an example of a data structure of various types of information that is used in the game system according to the embodiment and modified example of the present disclosure.

These pieces of information are structured by obtaining necessary information from owner information managed for the user in the game device 100. For example, as shown in FIG. 6D, the owner information includes, in association with a user ID 641 that uniquely identifies a user, a user name 642 indicating a nickname of the user set by the user, a language setting 643 indicating a display language set in the game device 100, a virtual residence setting 644 indicating an in-game residence of the own character, and development character information 645 indicating information about the own character, and may be maintained in the storage device 102. The development character information 645 includes a character ID 651 indicating an appearance of the own character, wearing information 652 indicating an item worn on the own character, gender information 653 indicating the gender of the own character, and a parameter 654 of the own character that can change depending on a development status.

Additionally, when uploading the information about the own character, each game device 100 obtains information about another-user character from the server 200 in order to use the same in an interaction game described below. When the server 200 receives the information about the own character from each game device 100, the server randomly selects a predetermined number of pieces (for example, a determined number of 10 or greater) of user information from the user information managed in the user DB 211 for users other than the user of the game device 100 in question. Then, the server 200 transmits the language setting 622 and the ghost information 623 of the selected predetermined number of pieces of user information to the game device 100 in question as information about another-user character.

When the predetermined number of pieces of information about another-user character is received via the infrastructure communication, the control unit 101 registers the information in an another-user list as the second list according to the present disclosure. Here, the another-user list is a list that manages information for displaying another-user character in an interaction game and is maintained in the storage device 102, for example.

In contrast, the information about the friend character is obtained from another game device 100 on the condition that the user has made in the game device 100 an operation input to communicate with another game device 100 in question. In addition, at this time, the game device 100 similarly transmits the information about the own character to another game device 100 that is a communication partner.

Since a user whose ghost information is shared via the infrastructure communication cannot be determined to be an acquaintance or friend of the user who is developing a character related to the ghost information, it is not preferable to share information such as a nickname that leads to identification of the user. For this reason, as described above, the information about another-user character transmitted from the server 200 does not include information (user ID 641, user name 642) leading to identification of an individual user. On the other hand, in the ad hoc communication, information is basically transmitted and received directly in a state in which the game devices 100 are put into a state of enabling communication at the same time. Therefore, it is assumed that the user of the game device 100 and the user of another game device 100 are acquaintances or friends. For this reason, the information about a character (information about the friend character/information about the own character) transmitted and received between the game devices 100 via the ad hoc communication is structured differently from the information about another-user character obtained by each game device 100 via the infrastructure communication. That is, in order to provide amusement elements that can be enjoyed between acquaintances or friends, information that is transmitted and received via the ad hoc communication includes information such as a nickname of the user. More specifically, the information about a character transmitted and received via the ad hoc communication includes, for example, the user ID 641, user name 642, game device language setting 643, virtual residence setting 644, and development character information 645 of the owner information managed in each game device 100.

When the information about a friend character is received via the ad hoc communication, the control unit 101 registers the same along with information on a reception date and time in a friends list as the first list according to the present disclosure. Here, the friends list is a list that manages information for displaying a friend character in an interaction game and is maintained in the storage device 102, for example.

In addition, the friends list and the another-user list have different list update conditions. In the present embodiment, the friends list is configured to be able to manage information about friend characters regarding up to eight users who have communicated via the ad hoc communication. When the information about a friend character is received via the ad hoc communication, the control unit 101 determines whether information about the same friend character has been already registered in the friends list. The above determination can be made, for example, by checking whether information with the same user ID has been registered in the friends list based on the user ID included in the received information. When information about the same friend character has been already registered, the control unit 101 updates the information about the same friend character registered in the friends list with the newly received information. This allows a user who has previously performed ad hoc communication to update the information of the character being developed (friend character) to the latest state. Additionally, when information about the same friend character has not been registered, the control unit 101 additionally registers the newly received information in the friends list. At this time, if information about up to eight friend characters has been already registered in the friends list, the control unit 101 replaces the oldest information registered in the friends list with the newly received information, thereby registering the newly received information in the list.

On the other hand, the another-user list is configured to be able to manage information about the predetermined number of another-user characters received from the server 200. When the control unit 101 receives the information about the predetermined number of another-user characters via the infrastructure communication, the control unit replaces all information currently registered in the another-user list with the information in question, thereby registering the information in the another-user list. That is, in the game device 100 of the present embodiment, all information in the another-user list is updated every time infrastructure communication is performed. The reason is described: unlike the friend character, the another-user character is not a character related to an acquaintance, a friend, and the like, so the another-user character does not need to be maintained for a long period of time, and the another-user character is updated frequently, thereby providing the user with such an amusement element that a game is being played with many users.

Additionally, the another-user list is referred to when an interaction game described below is played, and the information is used in order to cause an another-user character to be displayed in the interaction game. In other words, the information registered in the another-user list does not need to be updated when the interaction game is not played. Therefore, in an aspect, in order to reduce an amount of information transmitted and received via the infrastructure communication and to reduce an amount of power consumed in connection with communication, obtainment of the information about an another-user character from the server 200 may be performed on the condition that the another-user character is displayed in the interaction game based on the information registered in the another-user list. The above control may also be realized by not making a request to transmit information about an another-user character from the game device 100.

Interaction Game

The development game of the present embodiment can continuously develop one character, but includes an element that allows development of a new-generation character created by, for example, marrying another character. Due to the above element, it is possible to maintain a high level of interest in the development game without making a user bored.

When the ad hoc communication is performed, the game device 100 of the present embodiment can play a communication game of showing an aspect in which a friend character being developed on the communication partner's game device 100 is displayed and interacts with a own character. Accordingly, by using the above communication game to marry the own character and the friend character, it is possible to open up a development element of a new-generation character. On the other hand, the amusement element related to such a communication game requires that the owner of another game device 100, which is a communication partner, be present nearby. In addition, if the character to be married is limited to a character developed by a close acquaintance or friend, there is a possibility that a type of a character that can be created will be limited.

For this reason, the game device 100 of the present embodiment has an interaction game playing function in order to provide elements of interaction with various characters, including marriage with another character. The interaction game is structured so that characters (friend character, another-user character) whose information is registered in advance in the maintained friends list and another-user list are caused to appear in order to allow play even in an offline situation. In addition, in order to provide amusement by displaying characters with various personalities (characters decorated with various items) and amusement related to the marriage, it is assumed that the friend character and another-user character displayed in the interaction game are limited to characters who have reached a predetermined growth phase. Similarly, the interaction game is structured to be playable on the condition that the own character has reached the predetermined growth phase.

Figure 4:
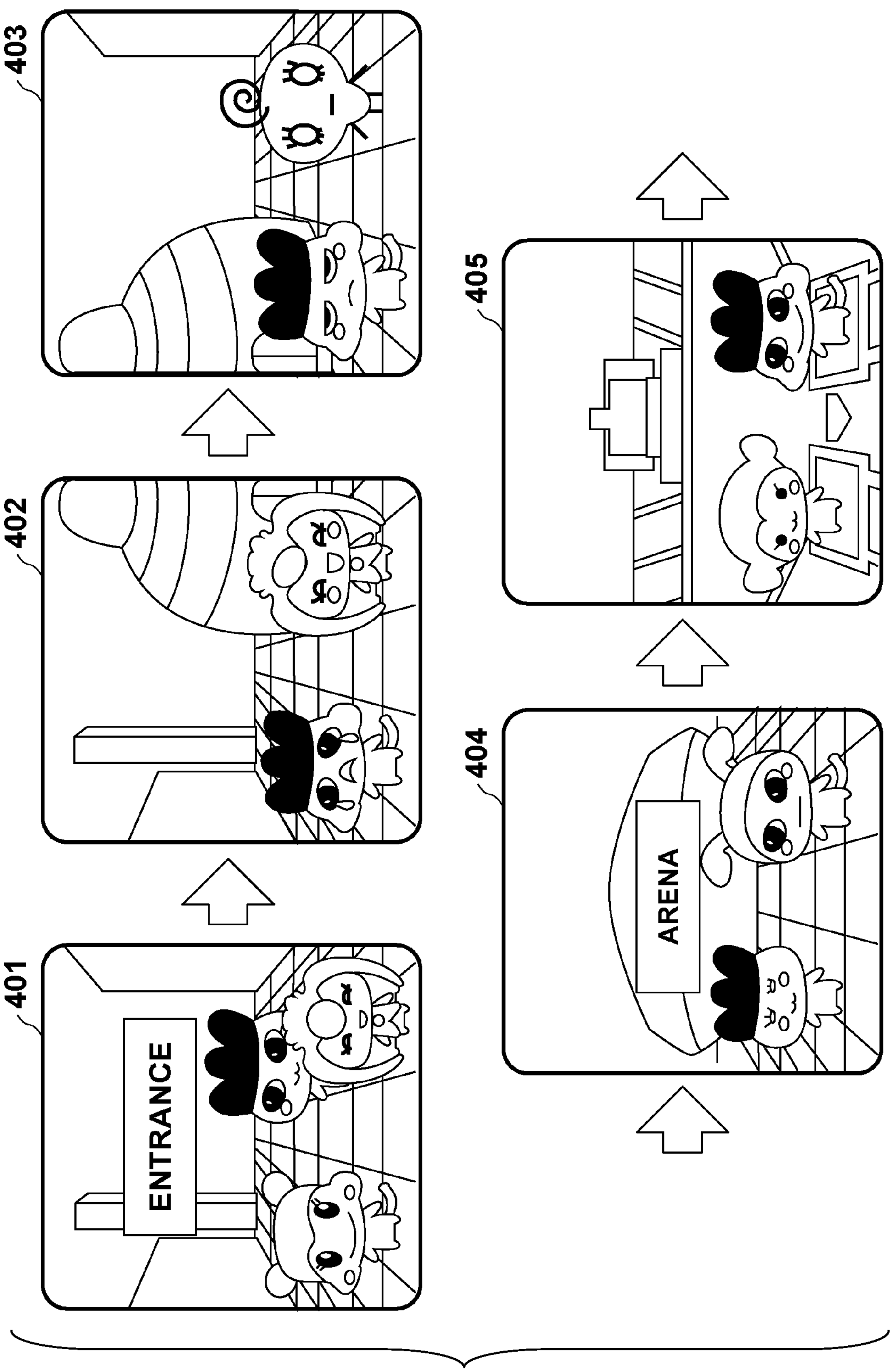
FIG. 4 is a diagram for illustrating an interaction game according to the embodiment and modified example of the present disclosure.

The interaction game is developed using an interaction area as shown in FIG. 4. As shown, in the present embodiment, the interaction area is composed of five regions, and when an operation input related to area movement is made, different regions are displayed sequentially (region 401→region 402→region 403→region 404→region 405→region 401→ . . . ). In a predetermined area, characters selected from friend characters whose information is registered in the friends list and another-user characters whose information is registered in the another-user list are placed separately in each region. The selected characters are placed in one certain region and are configured to be able to interact with the own character in the region in question.

Figure 7:
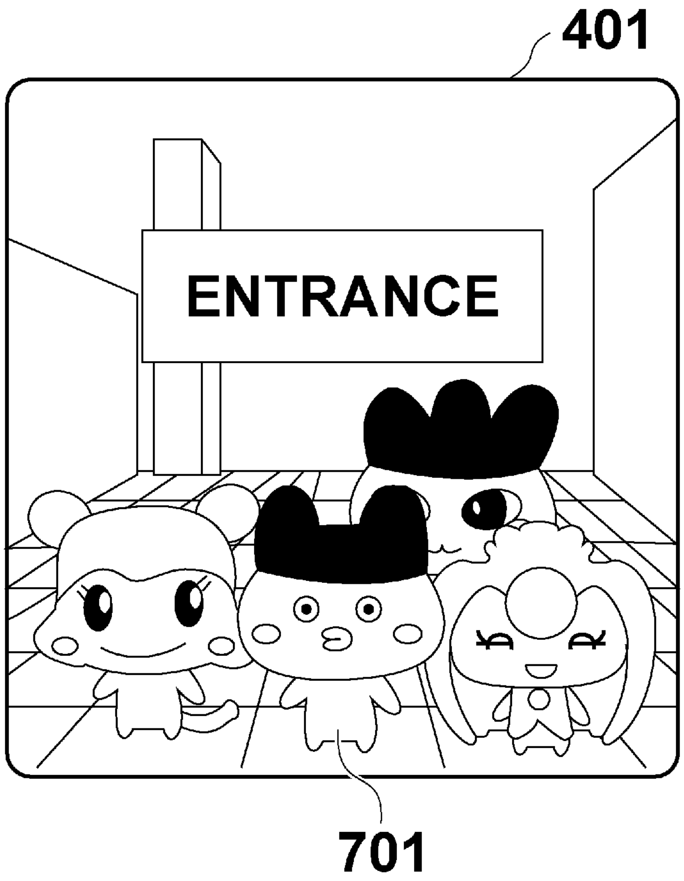
FIG. 7 is another diagram for illustrating an interaction game according to the embodiment and modified example of the present disclosure.

At the start of the interaction game, for example, after displaying the entire region, a performance showing the own character moving to the interaction area is displayed. An entrance gate of the interaction area is provided in one region 401 among the five regions, and the region 401 is controlled to be displayed at the start of the interaction game. As shown in FIG. 7, an own character 701 is displayed in the region 401 together with friend character or another-user character first placed in the region in question. When the user wants to move the own character 701 to another region, the user can move and display the own character 701 to the next region in the display order (the region 402 after the region 401) by making an operation input regarding region movement.

In the interaction area, motion of the friend character or another-user character placed is controlled without depending on the operation input from the user using the game device 100. In the interaction game of the present embodiment, the motion performed by the friend character or another-user character placed in the interaction area includes motion accompanied by a greeting performance to the own character. In order to convey to the user the amusement of interaction with users from various countries, the greeting performance is displayed differently based on the information of the language setting associated with the friend character or another-user character. For example, for an another-user character associated with a language setting of English, a greeting performance including a speech balloon display saying "Hi!" is displayed, and for an another-user character associated with a language setting of French, a greeting performance including a speech balloon display saying "Salut!" is displayed.

Selection Control of Displayed Characters

The number of characters placed in the interaction area is determined in advance, and in the present embodiment, one character is placed for a friend character and 10 characters are placed for an another-user character. Therefore, when playing an interaction game, the control unit 101, for example, selects one piece of information by lottery from the information registered in the friends list, and places one friend character corresponding to the information in question in a predetermined area. Additionally, when playing an interaction game, the control unit 101, for example, selects 10 pieces of information by lottery from the information registered in the another-user list, and places another-user characters of 10 bodies corresponding to the information in question in a predetermined area.

Interaction Game Processing

Figure 5:
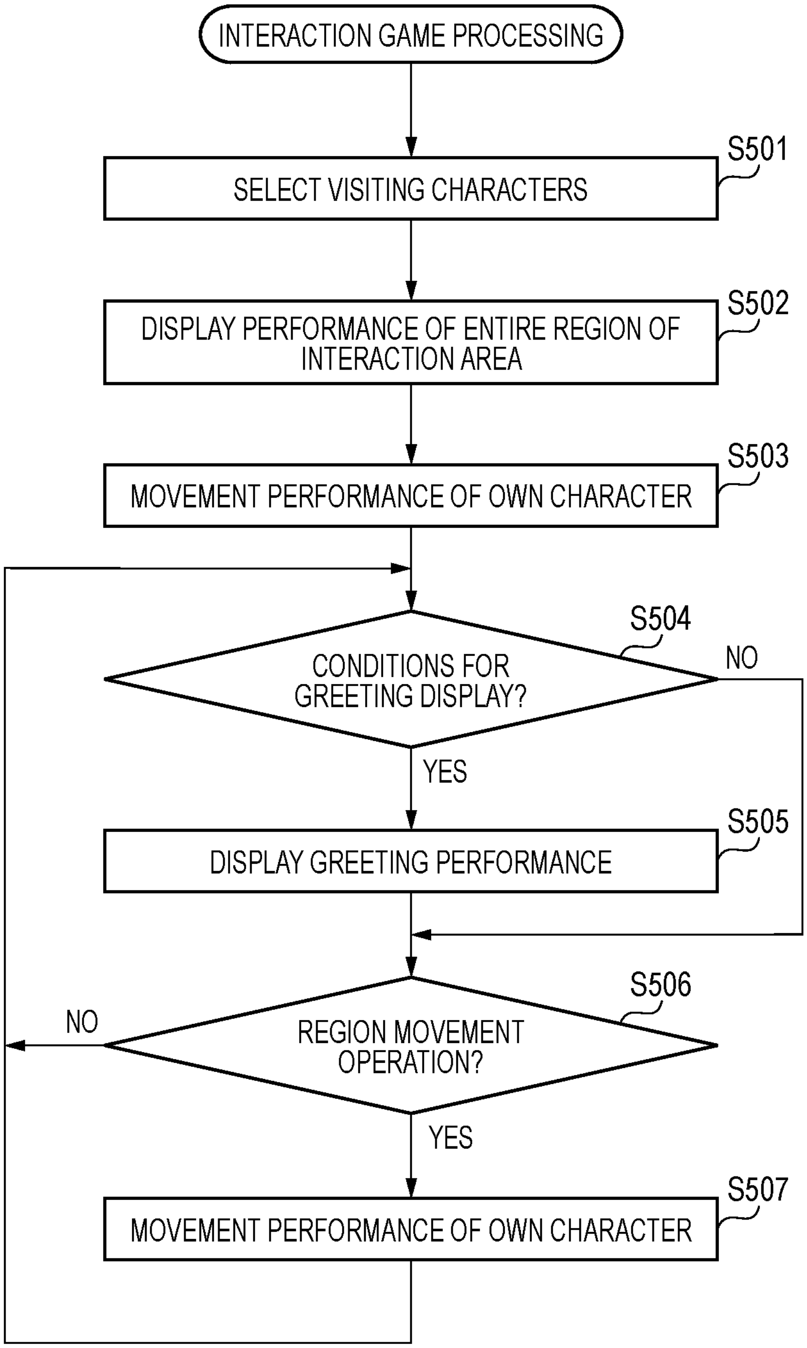
FIG. 5 is a flowchart showing an example of interaction game processing that is executed on a game device 100 according to the embodiment and modified example of the present disclosure.

Below, specific processing will be described using a flow chart of FIG. 5 regarding interaction game processing that is performed in relation to the interaction game on the game device 100 of the present embodiment. The processing corresponding to the above flow chart can be implemented by the control unit 101, for example, reading a corresponding processing program stored in the storage device 102, deploying the program to the memory 103, and executing the program. Note that the interaction game processing will be described as being started when, for example, an operation input related to menu selection of the interaction game is detected in the game device 100. Note that during execution of the interaction game processing, the GPU 104 sequentially creates corresponding screens related to the interaction game under control of the control unit 101, and the control unit 101 controls the screens to be displayed on the display 110.

In S501, the control unit 101 selects characters to be placed in the interaction area. Specifically, the control unit 101 selects, as characters to be placed in the interaction area (hereinafter, referred to as visiting characters), one character from the friend characters whose information is registered in the friends list and 10 characters from the another-user characters whose information is registered in the another-user list.

In S502, the control unit 101 places the visiting characters selected in S501 in the interaction area and causes a performance of showing an entire region of the interaction area to be displayed.

In S503, the control unit 101 causes a performance in which the own character moves to the region 401 of the interaction area to be displayed.

In S504, the control unit 101 determines whether a display condition of the greeting performance is satisfied for the visiting characters placed in the region being displayed. If it is determined that the display condition of the greeting performance is satisfied, the control unit 101 moves the processing to S505, and if it is determined that the display condition is not satisfied, the control unit moves the processing to S506.

In S505, the control unit 101 causes the greeting performance of the visiting character for which the display condition for the greeting performance is satisfied to be displayed, based on the information on the language setting registered in the friends list or another-user list.

In S506, the control unit 101 determines whether an operation input related to region movement has been made. If it is determined that an operation input related to region movement has been made, the control unit 101 moves the processing to S507, and if it is determined that the operation input has not been made, the control unit returns the processing to S504.

In S507, the control unit 101 causes a performance in which the own character moves to a next region in the display order in the currently displayed interaction area to be displayed, and then returns the processing to S504.

As described above, according to the game device of the present embodiment, it is possible to provide a communication element with high amusement.

Modified Example 1

In the above-described embodiment, when playing the interaction game, one friend character whose information is registered in the friends list and 10 another-user characters whose information is registered in the another-user list are selected as the visiting characters. However, the implementation of the present disclosure is not limited thereto. If neither information is registered in the friends list, the control unit 101 may control the friend character not to be included in the visiting characters. In addition, if information about 10 or more another-user characters is not registered in the another-user list, the control unit 101 may select default characters that are the insufficient number of characters, have been registered in advance in the storage device 102 and show different appearances, and cause the default characters to be displayed as the visiting characters.

Second Embodiment

In the above-described embodiment, it has been described that one friend character is always placed in the interaction area. However, the implementation of the present disclosure is not limited thereto. For example, when only one friend character whose information is registered in the friends list, the same friend character is placed in the interaction area every time, so the user may feel a sense of discomfort. For this reason, whether to place a friend character in the interaction area may be determined randomly through lottery processing each time the interaction game is played.

In addition, in an aspect where only one friend character is registered in the friends list, even when whether to place a friend character in the interaction area changes randomly through the lottery processing, the same friend character is frequently placed. Therefore, the lottery processing may be executed on the condition that information about a friend character has been newly obtained via the ad hoc communication after the execution of the previous lottery processing.

Modified Example 2

In the above-described embodiments and modified example, the aspect where a friend character of one body is selected as a visiting character from the friend characters whose information is registered in the friends list has been described. However, the implementation of the present disclosure is not limited thereto.

Since the opportunity to perform ad hoc communication with another game device 100 may be limited to a case or the like where an acquaintance or friend owns the game device 100, an update frequency of the information registered in the friends list may be low depending on the user. Therefore, when one friend character is randomly selected as a visiting character from the friends list, a friend character that has not left an impression on the user due to the long time elapsed since the information was received may be placed in the interaction area. In addition, since the visiting character is drawn using the information registered in the friends list, a friend character whose appearance does not change even though time has passed since the information was received, or whose appearance is not appropriate for the time when the interaction game is played (e.g., a different seasonal item is worn) may be placed in the interaction area. In this case, even when the friend character is placed and displayed in the interaction area, there is a possibility that it will not contribute to improving the amusement of the interaction game.

Therefore, in the present modified example, in order to improve the amusement of the interaction game, one friend character selected as a visiting character from the friends list is controlled as a friend character whose information has been recently obtained from another game device 100 via the ad hoc communication. That is, when a friend character is placed in the interaction area, the friend character becomes a character whose information has been recently obtained via the ad hoc communication and registered in the friends list. For this reason, a friend character that has left an impression on the user (a character that is being developed, such as a friend with whom the user has recently played) and may have an appearance suitable for the playing time of the interaction game can be displayed in the interaction game.

In particular, as in the second embodiment, in an aspect in which whether to select a friend character as a visiting character is determined by lottery processing on the condition that information about the friend character has been newly obtained via the ad hoc communication after execution of the previous lottery processing, a friend character whose information has been registered at a time closer to a playing time of the interaction game is selected as the visiting character. That is, a possibility that the friend character in question will have an appearance suitable for the playing time of the interaction game increases, making it possible to improve the amusement of the interaction game.

Modified Example 3

In the above-described embodiments and modified examples, it has been described that the friend character is placed and displayed in the interaction area in a manner that is the same as, and/or similar to, another-user character. However, the implementation of the present disclosure is not limited thereto.

The friend character is not, for example, a character randomly selected by the server 200 like another-user character, but is a character whose information is obtained by allowing the game device 100 to communicate with another game device 100 via the ad hoc communication at the user's intention. That is, the user is more likely to think of a friend character than another-user character. Therefore, in a display mode in which a friend character is blended in with another-user character as shown in FIG. 4, there is a possibility that the user will not be provided with a suitable play experience.

Figure 8A:
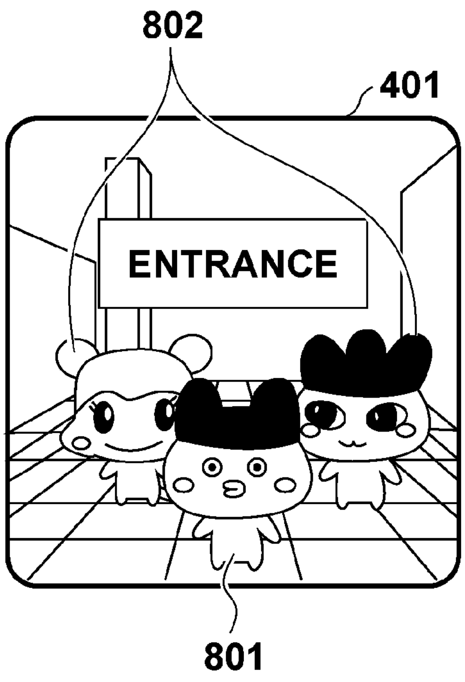
FIG. 8A is a diagram for illustrating an interaction game according to a modified example 3 of the present disclosure.
Figure 8B:
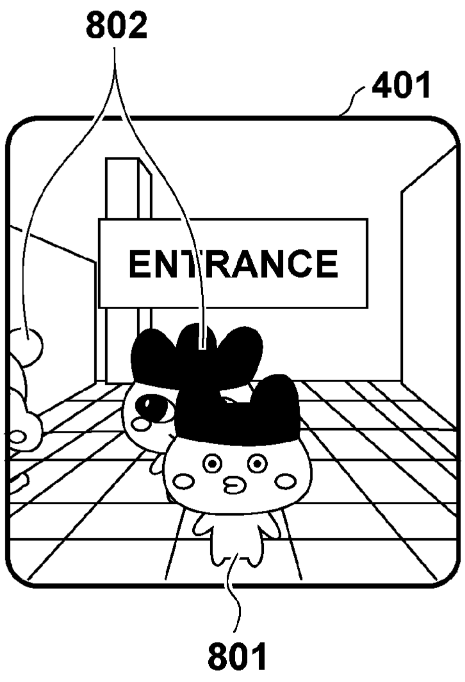
FIG. 8B is a diagram for illustrating an interaction game according to a modified example 3 of the present disclosure.
Figure 8C:
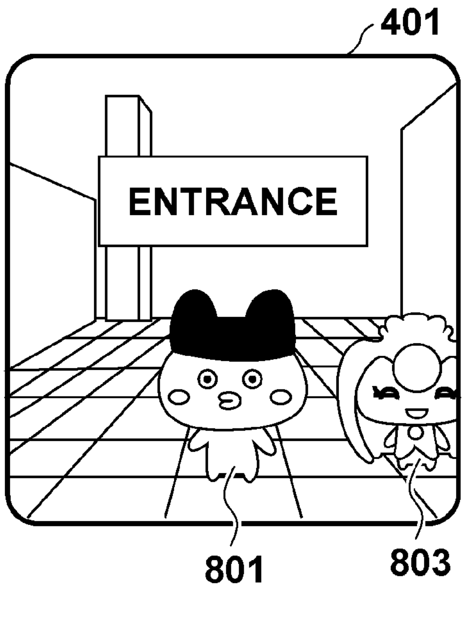
FIG. 8C is a diagram for illustrating an interaction game according to a modified example 3 of the present disclosure.
Figure 8D:
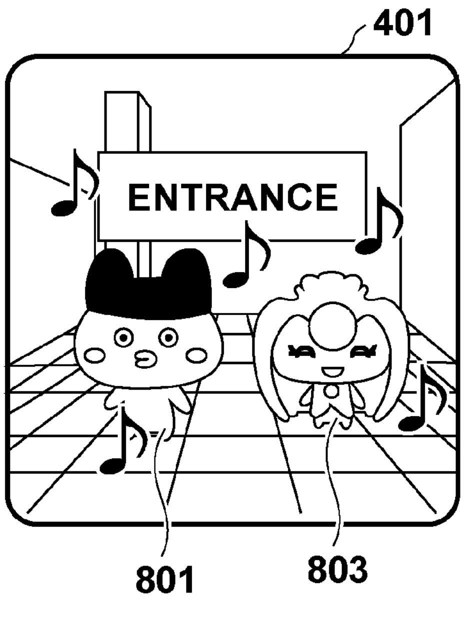
FIG. 8D is a diagram for illustrating an interaction game according to a modified example 3 of the present disclosure.

Therefore, when a friend character and another-user character are selected as visiting characters, these characters may be controlled to be displayed in different display modes. In an aspect, in order to make the appearance of the friend character in the interaction area more noticeable, after the interaction game starts and the own character entering the interaction area is displayed, the friend character is displayed accompanied by a dance performance in which the friend character and the own character dance together. The dance performance transitions as shown in FIGS. 8A to 8D, for example, and it is shown that the friend character is a different character from another-user characters. In the dance performance of FIGS. 8A to 8D, after two another-user characters 802 and an own character 801 are placed in the region 401 where the entrance gate is located (FIG. 8A), the display transitions to scenes in which two another-user characters 802 temporarily leave the entrance gate once (FIG. 8B), a friend character 803 appears (FIG. 8C), and then the own character 801 and the friend character 803 dance together (FIG. 8D). In addition, after the dance performance is presented, the two another-user characters 802 that have temporarily left are placed again in the region 401 and displayed together with the own character 801. The friend character 803 may appear only in the dance performance, or may be placed in the region 401 after the dance performance.

In the present modified example, the aspect in which the display mode of a friend character in the interaction game is made different from that of the another-user characters through the dance performance has been described. However, the implementation of the present disclosure is not limited thereto, and other display modes may also be adopted. The display modes of a friend character and another-user character may be made different by, for example, a different type of performance from the dance performance, or simply by explicitly differentiating display positions of the friend character and another-user character.

Modified Example 4

In the above-described modified example 3, it has been described that the friend character is displayed in the region 401 where the entrance gate is located. However, the implementation of the present disclosure is not limited thereto. The region 401 is a region that is first displayed on the display 110 at the start of the interaction game, and placing a character that attracts the user's interest in the region also leads to increasing the user's interest in the interaction game itself. Accordingly, the control unit 101 may perform control such that an another-user character that satisfies a predetermined condition among another-user characters selected as the visiting characters is placed in the region 401.

Third Embodiment

In the above-described embodiments and modified examples, the aspect in which 10 bodies selected in the lottery processing from the another-user characters whose information is registered in the another-user list are used as the visiting characters has been described. However, the implementation of the present disclosure is not limited thereto. The another-user character selected as the visiting character may be a character associated with the interaction area.

In an aspect in which an area attribute (theme park, sports stadium, or the like) corresponding to, for example, a placed building object or a background object is set in the interaction area or each region of the interaction area, a character associated with the area attribute may be selected as a visiting character from the another-user characters whose information is registered in the another-user list. For example, in an aspect in which an area attribute of a theme park is set for a certain region, an another-user character worn with an item associated with the theme park (an item with the same theme, an item of an associated character, an item with a theme color scheme, and the like) may be controlled to be preferentially selected as an another-user character to be placed in the region.

Additionally, in an aspect in which an event is held in the interaction area or a region of the interaction area, an area attribute related to the event may be set. In this case, for example, an another-user character worn with an item associated with the event, an item distributed/sold at the event, or the like may be controlled to be preferentially selected as the visiting character.

Alternatively, the present disclosure is not limited to those worn with items associated with the area attributes, and for example, an another-user character for which a language setting associated with the area attribute is made (a character developed by a user in the same area in a region associated with a specific area), or an another-user character of a gender associated with the area attribute may be controlled to be preferentially selected when selecting a visiting character.

Fourth Embodiment

In the above-described embodiments and modified examples, it has been described that a predetermined number of characters selected from the friend characters and another-user characters are placed in the interaction area of the interaction game being played. However, the implementation of the present disclosure is not limited thereto. For example, a character (hereinafter, referred to as special character) not based on the development game that is played on the specific game device 100, such as a character created by an operator side of the game system, may be placed in the interaction area. In an aspect, the special character may be a so-called collaboration character created with an appearance of a character appearing in another content, for example, in a collaboration event with another content.

Information about the special character may be provided to the game device 100 from the server 200 separately from the information about another-user characters, and may be referred to when an interaction game is played on the game device 100. The special character may be selected as a visiting character, for example, when the interaction game is played within a predetermined period, or may be controlled to be selected as a visiting character when the interaction area includes a specific region in which an area attribute associated with the special character is set.

Modified Example 5

In the above-described embodiments and modified examples, it has been described that a character selected in the lottery processing from the another-user characters whose information is registered in the another-user list is determined as a visiting character. However, the implementation of the present disclosure is not limited thereto. As described above, in an aspect in which an amusement element related to marriage with a character of a different sex is provided in the interaction game, in order for the user to use the amusement element, a character of a different gender from the own character needs to be placed in the interaction area. That is, in the aspect in which an another-user character as a visiting character is randomly selected by the lottery processing, there is a possibility that the amusement element will not be provided in the played interaction game. On the other hand, an aspect in which all visiting characters are set as characters of the same gender as the own character may give an unnatural impression to the user. For this reason, when selecting another-user characters as visiting characters, control may be performed such that the same number of another-user characters of each gender are included. Alternatively, control may be performed such that another-user characters of each gender are included in a predetermined proportion.

Note that the control of the proportion of another-user characters to be included in the visiting characters may be performed without being limited to the gender of the characters. For example, the number of characters to be included in the visiting characters may be controlled with respect to various attributes determined for characters, such as character's blood type, personality and appearance system, a worn item, and relationship to an event held in the interaction area.

Modified Example 6

In the above-described embodiments and modified examples, it has been described that when an interaction game is played on the game device 100, all information registered in the another-user list is replaced with the information about a predetermined number of another-user characters received via the infrastructure communication. However, the implementation of the present disclosure is not limited thereto. The amusement element of enabling interaction with different characters each time the interaction game is played can be provided even without the method of updating the another-user list. For example, the amusement element may be realized by replacing information about an another-user character displayed as at least a visiting character among the another-user list with information about an another-user character that is later received via the infrastructure communication.

Modified Example 7

In the above-described embodiments and modified examples, the aspect in which the information registered in the friends list and another-user list is used only for character display (confirmation of character appearance) in the interaction game has been described. However, the implementation of the present disclosure is limited thereto. Information other than appearance registered in each list may be displayed on the display 110 in a manner that allows the user to confirm the content of the information. Since the friends list and the another-user list have different roles, display control of the information registered in each list may be performed, for example, as follows.

The friends list stores information obtained when the game device 100 is allowed to communicate in the ad hoc manner between acquaintances, friends, or the like at the user's intention. That is, allowing users to check the information registered in the friends list can be advantageous from the standpoint of facilitating communication between the users. On the other hand, in the interaction game, the number of friend characters to be displayed is limited, and another-user characters are more displayed. For this reason, the information registered in the friends list is controlled such that it can be displayed even when the interaction game is not being played. For example, various information about friend characters may be controlled to be displayed on a screen that can transition from a menu or the like of the development game. The various information about friend characters displayed for the friends list includes, for example, the user name 642, the language setting 643, the virtual residence setting 644, and the wearing information 652, the gender information 653, and the parameter 654 included in the development character information 645 among the information received from another game device 100 and managed as owner information in the another game device.

In contrast, the another-user list stores information about a character developed by a user who cannot be determined to be an acquaintance or a friend. That is, the information registered in the another-user list is not information received/transmitted through the user's intention. In addition, the another-user characters whose information is registered in the another-user list are characters that are selected as visiting characters and whose appearance is not presented to the user unless displayed in the interaction game. Therefore, even when information about a character whose appearance is not presented is presented to the user, there is a possibility that the user will be confused. Additionally, since the another-user list is assumed to be updated more frequently than the friends list, there is a possibility that the information about another-user characters desired by the user cannot be displayed even when the information is allowed to be checked after the end of the interaction game. Therefore, the information registered in the another-user list is controlled to be displayed only during the playing of the interaction game. For example, in response to a predetermined operation input made while a game screen of the interaction game is displayed on the display 110, various information about another-user characters placed in a region included in the game screen may be controlled to be displayed. The various information about another-user characters displayed for the another-user list includes, for example, the language setting 643, and the wearing information 652 and the gender information 653 included in the development character information 645 among the information transmitted from any one game device 100 to the server 200 and managed as owner information in the game device in question. That is, the information displayed for the another-user list has fewer item types than the information displayed for the friends list, and does not include the information leading to identification of an individual user as described above.

Summary of Embodiments

The above embodiment discloses at least the following game device and storage medium.

(1) A game device for playing a game in which a character appears, the game device including:

a display controller configured to automatically display a first character related to the game that is played on the game device to be displayed on a display; and a communication circuit configured to perform communication by a first communication method of transmitting and receiving information to and from another game device and a second communication method of transmitting and receiving information to and from an external device different from the another game device, wherein the communication circuit is configured:

to obtain information about a second character that appears in the game that is played on the another game device from the another game device through the first communication method, and to obtain information about a third character that appears in the game that is played on any one game device from the external device through the second communication method, and wherein the display controller is configured to automatically cause characters selected from the second character and the third character to be displayed in a predetermined area in the game.

(2) The game device according to (1), wherein the display controller automatically causes at least one body of the selected characters to be displayed together with the first character when the first character moves to the predetermined area.

(3) The game device according to (1) or (2), further including an operation input interface for receiving an operation input from a user, wherein the first character is a character whose motion is controlled in response to an operation input from a user of the game device in the game that is played on the game device, wherein the second character is a character whose motion is controlled in response to an operation input from a user of the another game device in the game that is played on the another game device, and wherein the third character is a character whose motion is controlled in response to an operation input from a user of the any one game device in the game that is played on the any one game device.

(4) The game device according to (3), wherein motion of the selected characters in the predetermined area is controlled without being based on an operation input from a user.

(5) The game device according to any one of (1) to (4), wherein the selected characters include more of the third character than the second character.

(6) The game device according to (5), further including a lottery circuit for performing lottery as to whether to automatically cause the second character to be displayed in connection with display of the predetermined area, wherein when a result of lottery by the lottery circuit is a winning, the selected characters include the second character.

(7) The game device according to (6), wherein the lottery by the lottery circuit is performed on the condition that information about the second character has been obtained from the another game device using the first communication method after previous lottery has been performed.

(8) The game device according to (7), wherein the second character that is included in the selected characters when the result of lottery is a winning is the second character whose information has been recently obtained from the another game device using the first communication method.

(9) The game device according to any one of (6) to (8), wherein the display controller is configured to automatically cause the second character and the third character to be displayed in different display modes in the predetermined area.

(10) The game device according to (9), wherein the display controller is configured to automatically cause the second character to be displayed accompanied by a predetermined performance in the predetermined area.

(11) The game device according to any one of (5) to (10), wherein an area attribute is set in the predetermined area, and wherein the display controller is configured to automatically cause the third character associated with the area attribute set in the predetermined area to be included in the selected characters.

(12) The game device according to (11), wherein the information about the third character includes information for specifying at least an appearance of a character, and wherein the display controller is configured to automatically cause the third character having an appearance associated with the area attribute set in the predetermined area to be included in the selected characters.

(13) The game device according to any one of (5) to (12), further including an input interface for receiving an operation input, wherein the predetermined area includes a plurality of regions, and wherein the display controller is configured:

to place different characters among the selected characters in the plurality of regions, respectively, and to change a region to be displayed among the plurality of regions, in response to an operation input made during display of the predetermined area.

(14) The game device according to (13), wherein one region of the plurality of regions is determined as a region that is first displayed when the first character moves to the predetermined area, and wherein the display controller is configured to place the third character, which satisfies a predetermined condition, of the selected characters in the region that is first displayed.

(15) The game device according to any one of (1) to (14), wherein the display controller is configured to automatically cause a greeting performance of the third character of the selected characters to be displayed in the predetermined area.

(16) The game device according to (15), wherein the information about the third character includes information about a language setting in the any one corresponding game device, and wherein the greeting performance of the third character is different depending on the information about the language setting included in the information about the third character.

(17) The game device according to any one of (1) to (16), wherein the display controller is configured to further control the information about the second character and the information about the third character to be able to be displayed on the display.

(18) The game device according to (17), wherein the information about the second character includes information not included in the information about the third character.

(19) The game device according to (17) or (18), wherein the information about the second character includes information about a user of the another game device.

(20) The game device according to any one of (1) to (4), wherein the display controller is configured to automatically cause a character selected from the third character and the second character whose information has been recently obtained from the another game device using the first communication method to be displayed in a predetermined area during the game.

(21) The game device according to any one of (1) to (4), further including a management circuit configured to manage information on a character obtained by the communication circuit, wherein the management circuit is configured:

to register the information about the second character obtained through the first communication method in a first list, to register the information about the third character obtained through the second communication method in a second list different from the first list, and to make list update conditions different between the first list and the second list, and wherein the display controller is configured to automatically cause the selected characters to be displayed in the predetermined area based on the information about the second character registered in the first list and the information about the third character registered in the second list.

(22) The game device according to (21), wherein the management circuit is configured to replace, on the condition that the third character is displayed in the predetermined area based on the information about the third character registered in the second list, the information about the third character registered at least in the second list with information about the third character newly obtained when communicatively connected to the external device next time using the second communication method.

(23) The game device according to (22), wherein the management circuit is configured to replace, on the condition that the third character is displayed in the predetermined area based on the information about the third character registered in the second list, all information registered in the second list with information about the third character newly obtained when communicatively connected to the external device next time using the second communication method.

(24) The game device according to (23), wherein information about a predetermined number of the third characters is registered in the second list, wherein any one of a plurality of attributes is assigned to the character appearing in the game, wherein the communication circuit is configured to obtain the information about the predetermined number of third characters at a time from the external device using the second communication method, and wherein the information about the predetermined number of third characters obtained at a time includes information about the third characters of each attribute of the plurality of attributes at a predetermined proportion.

(25) The game device according to any one of (21) to (24), wherein the communication circuit newly obtains the information about the second character when communicatively connected to the another game device using the first communication method, wherein when information about the same character as the newly obtained information about the second character has been registered in the first list, the management circuit updates the information about the same character registered in the first list based on the newly obtained information about the second character, and wherein when information about the same character as the newly obtained information about the second character has not been registered in the first list, the management circuit registers the newly obtained information about the second character in the first list.

(26) The game device according to (25), wherein the first list has an upper limit on the number of pieces of information about the second character that can be registered, and wherein when information about the same character as the newly obtained information about the second character has not been registered in the first list and a number of pieces of the information about the second character registered in the first list reaches the upper limit, the management circuit replaces the oldest information registered in the first list with the newly obtained information about the second character.

(27) The game device according to any one of (21) to (26), wherein the display controller is configured to automatically cause a predetermined number of characters whose information is registered in the first list and the second list to be displayed as the selected characters in the predetermined area.

(28) The game device according to (27), wherein when a number of characters whose information is registered in the second list does not reach a number of the third characters that can be placed in the predetermined area, the display controller automatically causes the insufficient number of predetermined characters to be displayed.

(29) The game device according to any one of (1) to (28), wherein the second character and the third character displayed in the predetermined area are characters that have reached a predetermined growth phase in the game.

(30) The game device according to any one of (1) to (29), wherein the communication circuit is configured to further obtain information about a fourth character that is not based on the game played on the any one game device from the external device using the second communication method, and wherein when the information about the fourth character is obtained by the communication circuit, the display controller automatically causes characters selected from the second character, the third character, and the fourth character to be displayed in the predetermined area.

(31) The game device according to (30), wherein an area attribute is set in the predetermined area, and the display controller is configured to automatically cause the fourth character associated with the area attribute set in the predetermined area to be included in the selected characters.

(32) A non-transitory computer-readable storage medium storing a program for causing a computer to function as the game device according to any one of (1) to (30).

Other Embodiments

The disclosure is not limited to the above-described embodiments, and various modifications and changes can be made within the scope of the gist of the disclosure.

The invention claimed is:

1. A game device for playing a game in which a character appears, the game device comprising:

a display controller configured to cause a first character related to the game that is played on the game device to be displayed on a display of the game device; and a communication circuit configured to perform communication by a first communication method of transmitting and receiving information to and from a first game device of game devices other than the game device and a second communication method of transmitting and receiving information to and from an external device different from the first game device, wherein the communication circuit is configured to:

obtain, from the first game device, information about one or more second characters that appear in the game that is played on the first game device through the first communication method, and obtain, from the external device, information about one or more third characters that appear in the game that is played on a second game device of the game devices other than the game device through the second communication method, and wherein the display controller is configured to cause the first character and a character selected from the one or more second characters and the one or more third characters to be displayed concurrently on the display during the game.

2. The game device according to claim 1, wherein the display controller causes at least one of the selected characters to be displayed together with the first character when the first character moves to a predetermined area.

3. The game device according to claim 1, further comprising an operation input interface configured to receive an operation input from a user, wherein the first character is a character whose motion is controlled in response to an operation input from a user of the game device in the game that is played on the game device, wherein the one or more second characters are characters whose motion is controlled in response to an operation input from a user of the first game device in the game that is played on the first game device, and wherein the one or more third characters are characters whose motion is controlled in response to an operation input from a user of the second game device in the game that is played on the second game device.

4. The game device according to claim 3, wherein motion of the selected characters in a predetermined area is controlled without being based on an operation input from a user.

5. The game device according to claim 1, wherein a number of the third characters included in the selected characters is greater than a number of the second characters included in the selected characters.

6. The game device according to claim 5, further comprising a lottery circuit for performing lottery as to whether to cause the one or more second characters to be displayed in connection with display of a predetermined area, wherein when a result of lottery by the lottery circuit is a winning, the selected characters comprise the one or more second characters.

7. The game device according to claim 6, wherein the lottery by the lottery circuit is performed on a condition that information about the one or more second characters has been obtained from the first game device using the first communication method after previous lottery has been performed.

8. The game device according to claim 7, wherein the one or more second characters that are included in the selected characters when the result of lottery is a winning is the one or more second characters whose information has been recently obtained from the first game device using the first communication method.

9. The game device according to claim 5, further comprising an input interface configured to receive an operation input, wherein a predetermined area comprises a plurality of regions, and wherein the display controller is configured to:

place different characters among the selected characters in the plurality of regions, respectively, and change a region to be displayed among the plurality of regions, in response to an operation input made during display of the predetermined area.

10. The game device according to claim 9, wherein one region of the plurality of regions is determined as a region that is first displayed when the first character moves to the predetermined area, and wherein the display controller is configured to place the one or more third characters, which satisfies a predetermined condition, of the selected characters in the region that is first displayed.

11. The game device according to claim 1, wherein the display controller is configured to further cause the information about the one or more second characters and the information about the one or more third characters to be displayed on the display.

12. The game device according to claim 11, wherein the information about the one or more second characters comprises information not included in the information about the one or more third characters.

13. The game device according to claim 11, wherein the information about the one or more second characters comprises information about a user of the first game device.

14. The game device according to claim 1, wherein the display controller is configured to cause a character selected from the one or more third characters and the one or more second characters whose information has been recently obtained from the first game device using the first communication method to be displayed in a predetermined area during the game.

15. The game device according to claim 1, further comprising a management circuit configured to manage information on a character obtained by the communication circuit, wherein the management circuit is configured to:

register the information about the one or more second characters obtained through the first communication method in a first list, register the information about the one or more third characters obtained through the second communication method in a second list different from the first list, and make list update conditions different between the first list and the second list, and wherein the display controller is configured to cause the selected characters to be displayed in a predetermined area based on the information about the one or more second characters registered in the first list and the information about the one or more third characters registered in the second list.

16. The game device according to claim 15, wherein the management circuit is configured to replace, on a condition that the one or more third characters are displayed in the predetermined area based on the information about the one or more third characters registered in the second list, the information about the one or more third characters registered at least in the second list with information about the one or more third characters newly obtained when communicatively connected to the external device next time using the second communication method.

17. The game device according to claim 16, wherein the management circuit is configured to replace, on the condition that the one or more third characters are displayed in the predetermined area based on the information about the one or more third characters registered in the second list, all information registered in the second list with information about the one or more third characters newly obtained when communicatively connected to the external device next time using the second communication method.

18. The game device according to claim 15, wherein the communication circuit newly obtains the information about the one or more second characters when communicatively connected to the first game device using the first communication method, wherein when information about a same character as the newly obtained information about the one or more second characters has been registered in the first list, the management circuit updates the information about the same character registered in the first list based on the newly obtained information about the one or more second characters, and wherein when information about the same character as the newly obtained information about the one or more second characters has not been registered in the first list, the management circuit registers the newly obtained information about the one or more second characters in the first list.

19. The game device according to claim 18, wherein the first list has an upper limit on a number of pieces of information about the one or more second characters that can be registered, and wherein when information about the same character as the newly obtained information about the one or more second characters has not been registered in the first list and a number of pieces of the information about the one or more second characters registered in the first list reaches the upper limit, the management circuit replaces oldest information registered in the first list with the newly obtained information about the one or more second characters.

20. A non-transitory computer-readable storage medium storing a program for causing a computer to function as the game device according to claim 1.

* * * * *